F. W. EAMES.
COUPLING FOR VACUUM BRAKES.

No. 193,078. Patented July 17, 1877.

Attest:
P. Hannay
D. G. Stuart

Inventor:
Frederick W. Eames
A. McCallum

UNITED STATES PATENT OFFICE.

FREDERICK W. EAMES, OF WATERTOWN, NEW YORK.

IMPROVEMENT IN COUPLINGS FOR VACUUM-BRAKES.

Specification forming part of Letters Patent No. 193,078, dated July 17, 1877; application filed June 12, 1877.

*To all whom it may concern:*

Be it known that I, FREDERICK W. EAMES, of Watertown, in the county of Jefferson and State of New York, have invented certain new and useful Improvements in Couplings for Vacuum-Brakes; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to railroad braking apparatus; and consists in a new and improved device for coupling the pipes between the cars, said improved coupling being more particularly designed for use in connection with what is known as the "vacuum power-brake."

My new coupling consists of two parts or halves, right and left, one part being secured to the flexible portion of the air pipe or tube at one end of a car, and the other parts to the tube at the other end of the car.

Each car is to be similarly provided with parts of the coupling, one at each end of each car, arranged in the same manner, so that when two cars come together one will always present the right half, and the other the left half, or vice versa, and the coupling be always effected, it being impossible for two right halves or two left halves to come together, and thereby fail to couple.

The openings in the halves for the passage of the air are end openings, formed obliquely across the end, so that when the two halves come together they form an oblique or splice joint, leaving a clear opening and nearly direct channel for the passage of the air, without unnecessary friction caused by obstructing angles, as in the case with couplings having lateral openings.

The invention consists in this oblique form of end opening, and other new features in the construction of the coupling, all as hereinafter more fully set forth.

Figure 1:
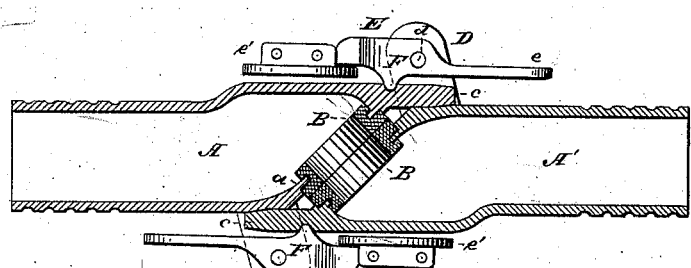
Figure 2:
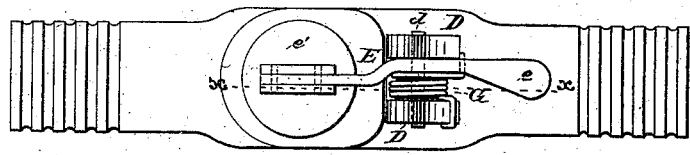
Figure 3:
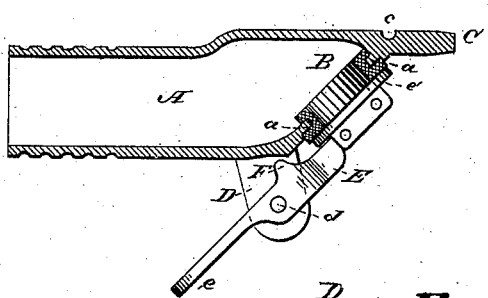
Figure 4:
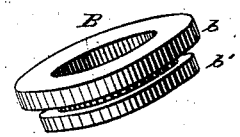
Figure 5:
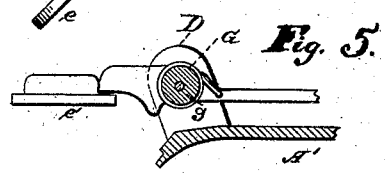

In the accompanying drawings, Figure 1 is a longitudinal sectional view of my improved coupling device. Fig. 2 is a top or plan view of the same. Fig. 3 is a detached view of one half of the coupling, shown partly in section. Fig. 4 is a detached view of one of the rubber gaskets in perspective. Fig. 5 is a sectional view taken on the line $x\ x$, Fig. 2.

Referring to the parts by letters, A A' represent the two halves or parts of the coupling. They are constructed in all respects alike, so that either part may be a right half or a left half, according as it may be attached to either end of the car.

As will be seen on reference to the drawings, the opening in the outer end of each half is in the form of an oblique cut. Around this opening an annular flange, $a$, is formed. B is a gasket of rubber or other suitable flexible material, formed with two annular flanges, $b\ b'$, so as to leave an annular groove between them, which, when the gasket is placed in position, is occupied by the annular flange $a$, as clearly shown by Figs. 1 and 3 of the drawings. The flange $a$ is sufficient to hold the gasket in proper position. Each half of the coupling is also formed with a projecting lug, C, on the outer side of which, some distance from the point, a lateral groove, $c$, is formed, the groove being semicircular in form.

D D are lugs or lateral projections formed on the side of the coupling opposite to the lugs C. E is a lever, which is pivoted between the lugs D by means of a pin, $d$, which passes laterally through the lugs. The outer end of the lever E is formed into a thumb-piece or handle, $e$, and its inner end is provided with a disk or valve, $e'$. On the inner side of the lever E is a projection or stud, F, of rounded form, corresponding to the form of the groove $c$. G is a spring coiled around a sleeve, $g$, which encircles the pin $d$, one end being secured to the lever E, and the other to one of the lugs D, as clearly shown by Fig. 2 of the drawings.

The operation is as follows: When the coupling of the pipes is to be effected, all that is necessary is to take hold of the parts, one in each hand; press on the outer ends of the levers E, thereby bringing them into the position shown by Fig. 1 of the drawings; then push the two parts together until the gaskets B come in contact; the projecting lugs will then overlap and the projection F enter the grooves $c$, all as shown by Fig. 1 of the drawings, and in which position the coupling will remain until the parts are again separated, either by hand or by the accidental separation of the cars. Should such an accident happen, the two parts of the coupling will separate without injuring the rounded projections F, by means of which they are held together, slipping easily out of the groove $c$. As soon as the parts are separated the springs G force the disks $e'$ against the gaskets B, thereby instantly closing the openings in the ends of the coupling, and preventing the passage of air into or from the tubes. When separated by hand the result is, of course, the same, all that is necessary being to pull the coupling apart.

Besides the advantage of a free unobstructed passage for the air, resulting from the peculiar form of the openings in the ends of the parts of the coupling before noted, this oblique form of end opening possesses other advantages over the coupling now in use, to wit: The joint, being a comparatively long splice, as it were, is not so liable to open, through the bending of the joint, as it would if the gaskets came together on a vertical or horizontal line.

Again, it will be obvious that the gaskets are brought into contact and separated without torsion and consequent friction, as, in couplings which require to be turned under pressure of the springs after they are brought together, the abrasion of the rubber caused by this friction under pressure soon cuts out parts of the face of the gasket, and causes leakage—an objection which is entirely obviated by my new form of opening.

Again, my improved coupling possesses peculiar advantages for use in connection with the vacuum-brake, as it affords a greater surface for the natural pressure of the atmosphere, which would of itself keep the couplings together, or, if separated, keep the valve closed when a vacuum is formed in the pipes, thereby obviating the necessity for a powerful spring.

By arranging the levers of the valves in the manner shown, and providing them with the projections F, I am enabled to dispense with the usual hooks as a separate device.

It will also be seen that the valves are located entirely outside of the coupling, so that while they are thoroughly efficient as valves to close the openings when required, they offer no impediment or resistance to the free passage of the air when the parts are coupled.

Having thus fully described my invention, what I claim as new, and desire to secure by Letters Patent, is—

1. The herein-described coupling, consisting of two parts, each the counterpart of the other, so as to be interchangeable at pleasure, and having end openings of oblique form, so that when brought together they form a splice-joint, and leave a clear, open, and unobstructed channel for the passage of the air, as set forth.

2. A coupling device having its valve located entirely outside, so that while equally efficient as a valve, it does not obstruct the passage of the air through the coupling when the parts are brought together, as set forth.

3. A coupling consisting of two parts, each the counterpart of the other, and having levers E, provided with valve-disks $e'$, operating in combination with the gaskets B, substantially as and for the purpose specified.

4. A coupling consisting of two parts, each the counterpart of the other, and having valve-levers E, provided with rounded projections or studs F, which engage with the correspondingly-shaped groove $c$, substantially as and for the purpose specified.

5. The combination of the parts A A$'$, having oblique end openings, with the flexible gaskets B B, seated in said openings, substantially as and for the purpose specified.

6. The gasket B, constructed, substantially as described, with two flanges, $b$ $b'$, and annular grooves between the flanges, in combination with the flange $a$ of the coupling, substantially as and for the purpose specified.

7. The combination of the coupling, having oblique end openings, the gaskets B, and levers E, having valve-disk $e$, with spring G and sleeve $g$, substantially as and for the purpose specified.

In testimony that I claim the foregoing as my own I affix my signature in presence of two witnesses.

FREDERICK W. EAMES.

Witnesses:
D. G. STUART,
EDWIN M. FRAZEE.